E. W. BRACKETT.
CLUTCH.
APPLICATION FILED SEPT. 10, 1913.
1,219,698.
Patented Mar. 20, 1917.
3 SHEETS—SHEET 3.
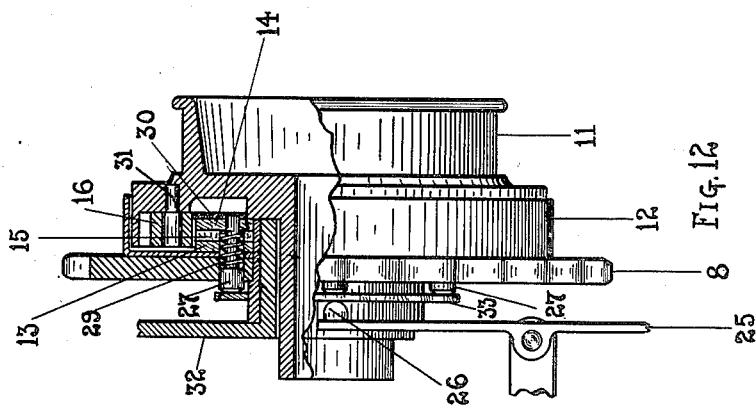
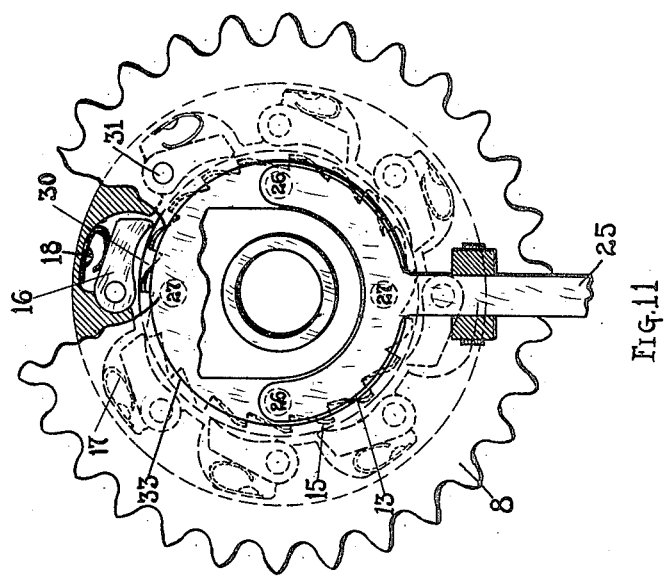
WITNESSES:
George L. Lang
Abraham Weissman
INVENTOR
Ernest W. Brackett
BY
Albion F. T. Libby
ATTORNEY

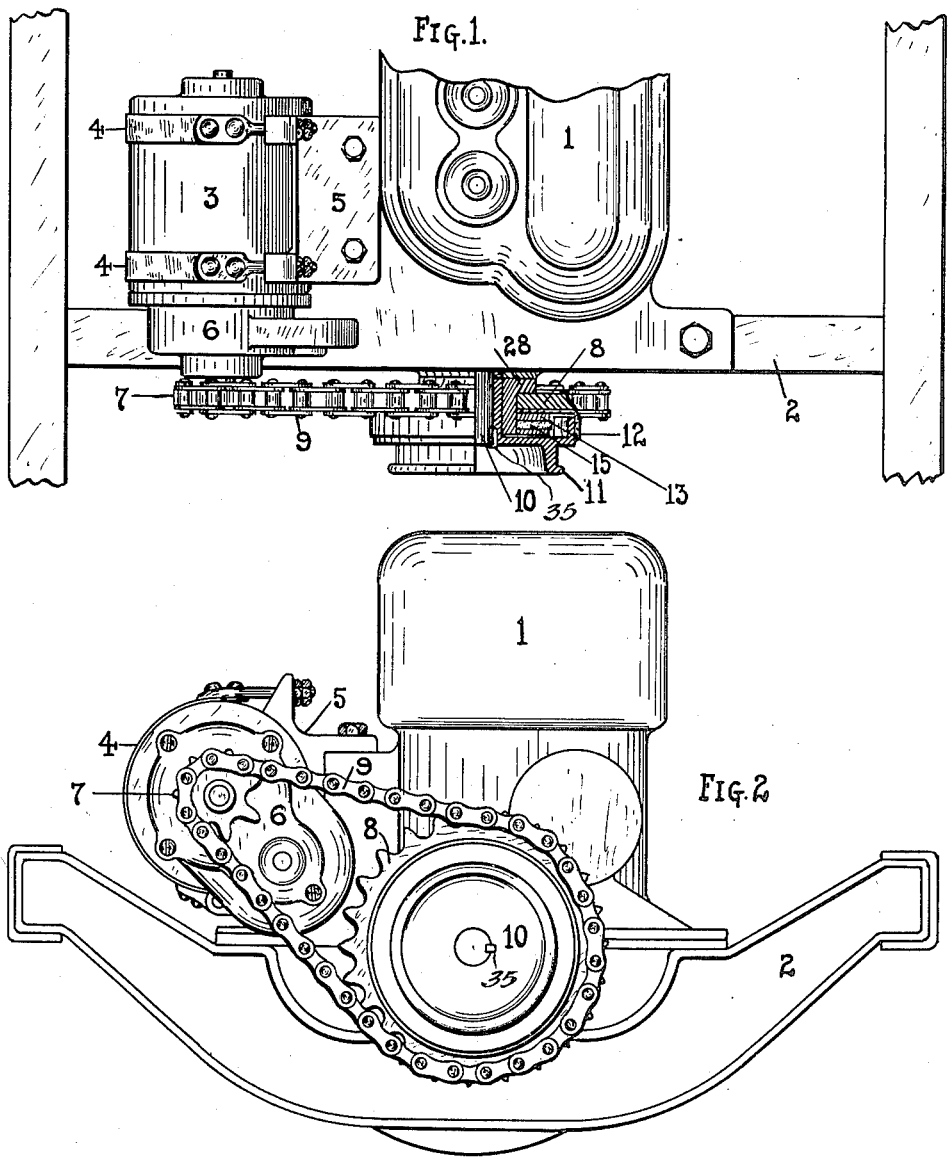

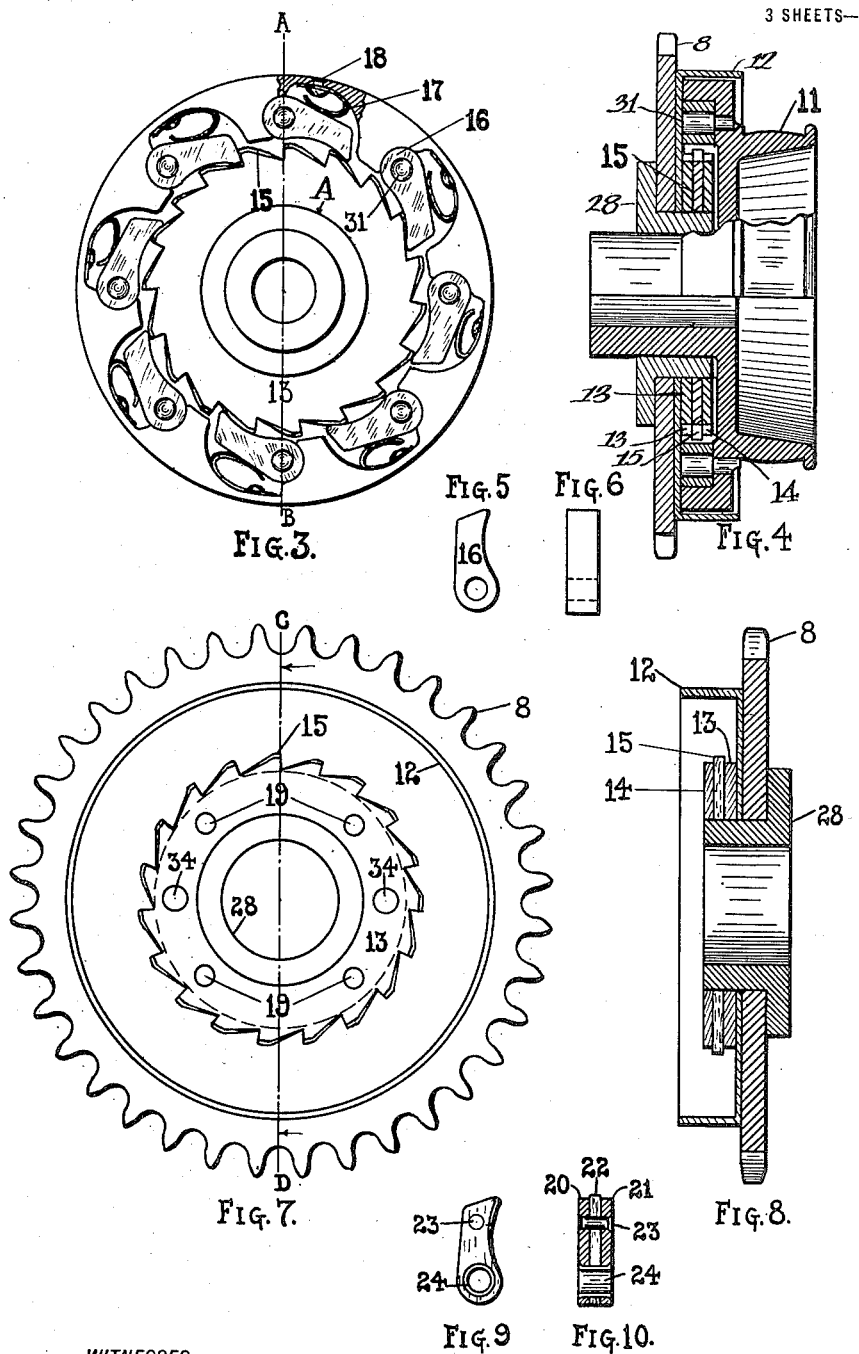

UNITED STATES PATENT OFFICE.

ERNEST W. BRACKETT, OF NEWARK, NEW JERSEY, ASSIGNOR TO SPLITDORF ELECTRICAL COMPANY, OF NEWARK, NEW JERSEY.

CLUTCH.

1,219,698.     Specification of Letters Patent.     Patented Mar. 20, 1917.

Application filed September 10, 1913. Serial No. 789,202.

*To all whom it may concern:*

Be it known that I, ERNEST W. BRACKETT, a citizen of the United States, resident of Newark, county of Essex, State of New Jersey, have invented certain new and useful Improvements in Clutches, of which the following is a specification.

My improvements relate to a clutch consisting of a driving and a driven member and means for connecting these members together in an operative manner so that they will act positively and without noise, friction and consequent wear of the parts as usually accompanying the working of an ordinary clutch.

My invention is more particularly adapted for use in starting internal combustion engines, used on moving vehicles, such as automobiles, motor boats, flying machines and the like and in order to bring out the features of my invention, I have shown the same as applied to an automobile engine.

My invention is directed particularly to the means by which a starting motor can be connected and disconnected from an internal combustion engine.

In the early days of the automobile industry, the usual method of starting the engine was by means of a hand crank, but to make it easier and more convenient, certain mechanisms have been applied to the engine by which the same can be started from the driver's seat. A number of ways and means have been suggested and tried out for this work. The majority of which devices use overrunning clutches, so that when the engine picks up under its own power, it is free to "run away" from the driving member. I have found, by tests and experiments, that these overrunning clutches are relatively expensive and give a great deal of trouble, in that they are susceptible to wear.

By my invention, I seek to overcome these difficulties and have produced a clutch which is simple, cheap to manufacture and is free from defects existing in clutches in use at the present time.

My improvements are illustrated in the following drawings in which like characters are used, to represent corresponding parts in the various figures.

Figure 1 is a plan view, showing a portion of the engine and the chassis, on which the engine is mounted, together with the starting motor and reducing gear, and the clutch connected thereto, a portion of the clutch being shown in section.

Fig. 2 is an end elevation of Fig. 1.

Fig. 3 is a view of the two clutch members, with the large driving sprocket removed.

Fig. 4 is a view partly in section on the line "A B" of Fig. 3, and showing the large driving sprocket assembled in position.

Fig. 5 is one view of one of the pawls, used on one of the clutch members.

Fig. 6 is a side view of Fig. 5.

Fig. 7 shows the driving member complete.

Fig. 8 is a section on the line "C D" of Fig. 7.

Fig. 9 shows the modified form of pawl and Fig. 10 is a sectional drawing of Fig. 9.

Fig. 11 shows the end view of a modified form or arrangement of my device, a portion being broken away to show the manner of holding the pawls out of engagement with the ratchet wheel.

Fig. 12 is a side elevation of Fig. 11, a portion being shown in section, to illustrate the details of Fig. 11.

Referring particularly to the details, 1 represents a portion of the engine, which is mounted on the frame work 2. Attached to the side of the engine by means of a bracket 5, and straps 4, is an electric motor 3. Mounted on the end of the motor 3, is a gear casing 6, which incloses a suitable set of gears for reducing the speed of the motor to a certain predetermined point. At this point, I may state, that it is preferable to use a comparatively high speed motor for this class of work, and to connect it with the engine that is to be started through a suitable gear reduction. This gear reduction is not shown as it forms no part of my invention.

Mounted on the shaft extension of said gear reduction is a small sprocket 7, connected to the large sprocket 8, by means of a suitable chain 9. The chain 9, therefore, becomes the driving medium for the driving member of the clutch. This driving member, as illustrated in Figs. 7 and 8, consists of the sprocket wheel 8, mounted on a suitable sleeve 28. Fastened securely to the sprocket wheel, is an element preferably put up as a unitary structure. This element as shown, consists of three portions, 13, 14 and 15. The parts 13 and 14 are suitable metal pieces, adapted to carry the strain, or load, applied to them by the pawls, which will be described later. Between the parts 13 and 14 is a piece 15, which is used as a sound deadening device. This may be either of leather, fiber or other suitable material, having this characteristic. The member 15, at one portion, projects above the parts 13 and 14, and tapers gradually to the bottom of the notch, which is engaged by the pawls. The parts 13, 14 and 15 are adapted to be fastened together by rivets, 19, and then the unit is mounted on the sleeve 28, and fastened to the sprocket wheel and sleeve by means of bolts, passing through the holes 34. These bolts are not shown. I may also use dowel pins to help hold the said piece in position on the sprocket 8. Between this unitary ratchet wheel and the sprocket wheel is a piece 12, preferably of sheet metal, which serves as a housing for the ratchet wheel and the pawls when the driving and driven members are assembled.

The driven member as illustrated in Figs. 3 and 4, consists of a metal wheel 11, having a projecting hub, which hub slips on over the crank shaft 10 of the engine, and is securely fastened thereto as by means of key 35 or by a shrink fit. The wheel 11, as shown, is adapted to receive a belt on the outer portion, said belt being used to drive the fan for keeping the radiator of the engine cool. However, this is in some cases, not needed, but in the present case, is utilized for this purpose. Mounted on the inner surface of the wheel 11, are a plurality of pawls 16, which are set on pins 31. Pressing against the pawls are springs 17, which are fastened to the wheel by means of the rivets 18. The springs 17 hold the pawls in engagement with the sound deadening piece 15. One of the pawls is shown in Figs. 5 and 6, but is so simple as not to need any further description. I have so arranged the number of pawls and teeth in the ratchet wheel that one of the pawls is nearly ready to engage with one of the said teeth in whatever position they may be placed. The object of this is to prevent clashing and jerks when the driving member engages the driven member; in other words, my arrangement of pawls and ratchets is such as to give a smooth and easy operation.

The operation of the clutch shown in the drawings, and as above described, is as follows:—

The operator by means of push switch connects the source of power, usually a storage battery, to the starting motor. The starting switch, battery and leads to the motor, are not shown, for the sake of simplicity, as it is well known, how these connections are made. As soon as the power is applied to the motor, the driving member driven by the sprocket 8, begins to turn, and almost immediately one of the pawls engages with a ratchet tooth attached to the driving member, and causes the driven member, which as previously described, is connected to the crank shaft, of the engine, to turn, and the engine takes in a charge of gas, and is fired in the usual manner. As soon as the charge is fired, and engine picks up under its own power, it begins to turn the shaft and driven member considerably faster than it was formerly turned by the electric motor, and the driven member carrying the pawls, runs away from the ratchet element connected to the driving member. As the pawls run over the ratchet elements, they engage the sound deadening part 15, and the noise consequent to a pawl and ratchet device operated in this manner, is eliminated. As soon as the engine reaches a certain predetermined speed, the pawls are thrown out by centrifugal force, away from the ratchet element, and remain out of engagement with the said ratchet element. On slowing down the engine, or bringing this speed to a certain predetermined amount, the springs 17 carry the pawls back on to the sound deadening part 15, and when the engine stops, leave them in a position to engage the ratchet element when it is again desired to start the engine. With this construction, I have found that the sound produced by the ordinary pawls and ratchet element, to be very objectionable, and I have overcome this difficulty by the construction above described.

I do not wish to be limited to this exact construction, as I may use a ratchet element without any sound deadening device associated therewith, as I may place this sound deadening device in the pawl itself. This is illustrated in Figs. 9 and 10, in which, 20 and 21 are the two strain elements, and 22 is the sound deadening piece, all being fastened together by the rivet 23, and bushing 24. I may also hold the pawls out of engagement with the ratchet wheel and cause them to engage with the ratchet wheel in other ways, one of which is shown in Figs. 11 and 12. As shown in said figures, 25 is a lever running to the dash on the automobile, and may be associated with the push switch which closes the circuit to the electric motor. This lever, at its extremity, carries bearing points 26, these said bearing points resting against the plate 33, which, in turn, is in engagement with pins 27, the pins 27 passing through the driving element, consisting of sprockets 8, flange 12, ratchet elements 13, 14 and 15, and one end is fastened to the annular plate 30. By means of spring 29, these pins hold the plate 30, in the position shown in Fig. 12, and also in the part section of Fig. 11, the position of plate 30, as shown, maintains the pawls out of engagement with the ratchet.

When the foot switch is operated, the lever 25 is also operated, and this through the said pins 26 and plate 33, and the pins 27, carries the plate 30 back out of engagement from the pawls and allows them to drop down on the ratchet wheel, and they are then ready to engage the ratchets, and consequently drive the driven member. While I have shown a noise killing piece 15, between the strain elements 13 and 14 in this modified form, it may or may not be used, for since the pawls are held away from the ratchet wheel by plate 30, they can produce no clicking noise at very slow speeds of the engine, in which condition, the pawls are down in my preferred form. When the engine picks up under its own power, the pawls 16 are thrown out of engagement with the ratchet wheel, as previously described, and when the foot is released from the starting switch, the plate 30 goes back into the position shown, and the pawls are thus held away from the ratchet wheel.

My clutch as shown and described herein is particularly adapted for the purpose of starting a hydrocarbon engine and I believe I am the first to use a clutch of this character for this purpose. I have shown and described the preferred form of my invention and have shown by way of illustration, two modified forms which are the means of killing noise produced by the pawls and ratchets during engagement at a certain speed yet I do not wish to be limited to the exact forms shown, as it is easily seen that a number of changes can be made in the various devices, without departing from the spirit of the invention or the scope of the appended claims.

Having thus described my invention, what I claim, is:

1. A clutch consisting of a driven member and a driving member, said driving member comprising a sprocket wheel and a ratchet wheel, and having a flanged member between said sprocket wheel and ratchet wheel, and extending over the driven member to form a housing for the parts within said driven member.

2. A clutch consisting of two members, one adapted to be driven, and the other adapted to act as the driver, said driver consisting of a sprocket wheel and a ratchet wheel, rigidly connected, said ratchet wheel having two elements of similar character, with a sound deadening element clamped therebetween, and means on the driven element to engage the two elements on the ratchet wheel, substantially as described.

3. A clutch consisting of a driving and a driven member, said driving member consisting of a ratchet device provided with teeth and having a noise reducing element associated with a strain or working element or elements, said driven member carrying a plurality of pawls, said noise reducing element constructed and arranged to keep the pawls from contact with the strain or working element or elements except at the working portions of the teeth.

4. In a device of the class described, a driving member including a sleeve which serves as a bearing for said driving member and a sprocket wheel mounted upon said sleeve to rotate therewith, a driven member adjacent to the driving member and having a part overhanging a portion of the driving member and another part formed to receive a belt, clutching means between the overhanging part of the driven member and the driving member, and a sheet metal member between said sprocket wheel and the driven member and adapted to coöperate with said overhanging part thereof to form a housing for the clutching parts.

5. In a device of the character described, the combination of a driven member and a driving member, said driving member carrying a ratchet wheel and a sound reducing element rigidly attached to said ratchet wheel teeth, said driven member carrying pawls so distributed around the periphery of the ratchet wheel that one of said pawls is supported on the sound deadening element and nearly ready to engage with one of the ratchet teeth, on the ratchet wheel, for the purpose as described.

6. A clutch consisting of the combination of driving and driven members, one of said members carrying a ratchet wheel and the other a plurality of pawls, and means operatively associated with said driving and driven members constructed and arranged to keep the pawls from contact with the ratchet wheel except at the working portions of the teeth thereof.

7. In a device of the character described, the combination of a driving and a driven member, said driving member carrying a ratchet wheel, said driven member carrying a plurality of pawls, sound deadening element or elements attached to one of said members, said pawls being so arranged that one or more of them always rests on said sound deadening element or elements when the driving and driven members are at rest and until a predetermined speed of the driven member is reached, substantially as and for the purpose described.

8. In a device of the character described, the combination of driving and driven members, one of said members carrying a ratchet wheel and the other a plurality of pawls, means for producing substantially noiseless operation of the pawls as they slide over the ratchet teeth and means for holding the pawls in normal engagement with the noise killing means, up to a predetermined speed, substantially as and for the purpose described.

9. In a device of the character described, the combination of driving and driven members, one of said members carrying a sprocket and a ratchet wheel and having a flanged member therebetween and extending over the driven member to form a housing and the other a plurality of pawls, means for normally holding the pawls out of engagement with the ratchet wheel, and means for causing them to engage therewith for the purpose described.

10. In a device of the character described, the combination of a driving member and a driven member, one of said members carrying a sprocket and a ratchet wheel and having a flanged member therebetween and extending over the driven member to form a housing and the other a plurality of pawls, an annular plate adapted to be moved, and normally holding said pawls out of engagement with the ratchet wheel and means for moving said annular plate to drop the pawls into engagement with the ratchet wheel, substantially as described.

11. In a device of the character described, the combination of a driven member and a driving member, means on said members consisting of pawls and ratchet teeth respectively for engaging and disengaging automatically at predetermined speeds of the driven member, and a noise-killing device associated with one of said engaging means and so arranged with respect thereto that no working stress is imposed upon said noise-killing device while said pawls and ratchet teeth are in operative engagement.

12. In a device of the character described, the combination of a driven member and a driving member, pawls carried on said driven member, a ratchet wheel carried on said driving member, a noise killing device associated with said ratchet wheel and so disposed with respect thereto as to project above the slanting faces of the ratchet teeth but not beyond the straight abrupt faces of said ratchet teeth, whereby no stress is applied to the noise killing device when the two first mentioned members are in driving engagement with each other.

13. In a device of the class described, a driving member including a sprocket wheel mounted on a sleeve and a clutch portion adjacent said sprocket and extending laterally therefrom, said sleeve being adapted to rotate with said sprocket wheel as a bearing therefor, a driven member adjacent to the driving member and having a part overhanging said clutch portion of the driving member and another part formed to receive a fan belt, clutching means on the overhanging part of said driven member adapted to coöperate with said clutch portion of the driving member, and a sheet metal member between said sprocket wheel and the driven member adapted to coöperate with said overhanging part thereof to form a housing for the clutching parts.

14. In a device of the class described, the combination of a driving member having a sprocket wheel attached thereto, a driven member adjacent to the driving member and cup shaped at one end to inclose a portion of said driving member, the other end of said driven member being formed and adapted to receive a fan belt, clutching means between said driving and driven members, and a sheet metal member between the sprocket wheel and said driven member and adapted to coöperate with said cup shaped end thereof to form a housing for the clutching parts.

15. In a device of the class described, driving and driven members, said driving member including a sprocket wheel, means adapted to clutch said members together, and a sheet metal member adjacent said sprocket wheel and coöperating with the driven member to form a housing for said clutch means.

16. In a clutch, the combination of a driving member having a sprocket wheel attached thereto, a driven member adjacent to the driving member and having a part overhanging a portion of the driving member and another part formed and adapted to receive a fan belt, clutching means between the overhanging part of the driven member and the driving member, and a sheet metal member between the sprocket wheel and the driven member and adapted to coöperate with said overhanging part thereof to form a housing for the clutching parts.

In testimony whereof I affix my signature in the presence of two witnesses.

ERNEST W. BRACKETT.

Witnesses:
M. W. BARTLETT,
A. D. T. LIBBY.